United States Patent [19]

Falcoz et al.

[11] 4,247,334

[45] Jan. 27, 1981

[54] HYDRAULIC CEMENT COMPOSITIONS

[75] Inventors: Pierre Falcoz, Champagne au Mont d'Or; Raymond Filhol, Lyon; Jean-Noel Communal, Villeurbanne, all of France

[73] Assignee: Rhone-Poulenc Industries, Paris, France

[21] Appl. No.: 955,510

[22] Filed: Oct. 27, 1978

[30] Foreign Application Priority Data

Oct. 28, 1977 [FR] France .................................. 77 33343

[51] Int. Cl.$^3$ .............................................. C04B 7/35
[52] U.S. Cl. ..................................... 106/90; 106/314; 106/315
[58] Field of Search .................. 106/89, 90, 314, 315, 106/97

[56] References Cited

U.S. PATENT DOCUMENTS

| | | | |
|---|---|---|---|
| 2,806,530 | 9/1957 | Binkley | 106/89 |
| 2,868,295 | 1/1959 | Brooks et al. | 106/89 |
| 3,782,991 | 1/1974 | Burge | 106/315 |
| 4,028,125 | 6/1977 | Martin | 106/90 |

*Primary Examiner*—James Poer
*Attorney, Agent, or Firm*—Burns, Doane, Swecker & Mathis

[57] ABSTRACT

The processibility and initial mechanical strengths of hydraulic cement compositions, e.g., Portland cement, are improved by formulating therewith an adjuvant comprising (i) a water-soluble salt of the condensation product of an aromatic sulfonic acid with HCHO (formulated either alone or in admixture with a water-soluble salt of an aromatic sulfonic acid which has not been condensed with HCHO), (ii) lithium hydroxide, and (iii) a hydroxide of another alkali metal or of an alkaline earth metal.

25 Claims, No Drawings

HYDRAULIC CEMENT COMPOSITIONS

BACKGROUND OF THE INVENTION

1. Field of the Invention

The present invention relates to a process for improving the processing parameters and the mechanical properties of mixtures based on hydraulic binders, especially Portland cements or similar cements. The invention also relates to novel compositions which can be used as adjuvants in mixtures based on hydraulic binders.

2. Description of the Prior Art

It is well known to this art that a mixture consisting of hydraulic cement, of water and of a filler such as sand or gravel [hereafter referred to as a hydraulic cement composition] gradually loses its fluidity once the mixture has been prepared, due to the progress of setting, and in the case of concrete this loss is referred to as the loss of ability to flow and spread. Thus, if a long time is provided between mixing the cement and casting same, it is necessary to prevent this loss in fluidity.

In order to restore fluidity to the cement if the cement composition has become viscous, the addition of water has hitherto been employed. However, in such a process, the weight ratio of mixing water/cement [hereafter referred to as the W/C ratio] is altered (increased) by the addition of water, and this results in undesirable phenomena, such as a reduction in the mechanical strength of the finished product.

In order to overcome the above-mentioned disadvantages, it has been proposed to add to the hydraulic cement compositions dispersing agents which function to bring the binder into a fluid and easy-to-work form, while tending to reduce the amount of water necessary for mixing; these agents are commonly referred to as water-reducing agents.

The prior art, especially U.S. Pat. Nos. 2,141,569, 3,277,162 and 3,677,780 and French Patent No. 2,165,681 teaches that from among the water-reducing agents, the best known and also the most commonly used are the water-soluble arylsulfonate or alkylarylsulfonate salts, the organic moiety of which either may or may not have been condensed with formaldehyde. However, these products are still not completely satisfactory because their use in cold weather, especially at temperatures of between 0° and 15° C., is accompanied by a slowing down of the hardening. If such dispersing agents are added to cements, good results are indeed observed in respect to fluidity, but, on the other hand, it is found that the initial mechanical strengths, for example, those measured after 24 hours, are substantially reduced. Accordingly, a serious need exists in this art for a process to improve the properties of hydraulic cement compositions which makes it possible to overcome the noted disadvantage of lowering of mechanical strengths as a result of cold weather, while at the same time preserving the above-mentioned advantages, in particular the fact that a fluid, easy-to-work binder is obtained.

SUMMARY OF THE INVENTION

There has now been found, and which is a major object of the present invention, a process which makes it possible to improve the processing parameters and the initial mechanical strengths of hydraulic cement compositions at temperatures as low as 0° to 15° C., which process comprises adding to the hydraulic cement composition a dispersing agent selected from the group comprising the water-soluble salts derived from the condensation products of aromatic sulfonic acids with formaldehyde, the said salts being employed separately or mixed with water-soluble salts derived from aromatic sulfonic acids, and said process being further characterized in that there is also added to the hydraulic cement composition a mixture of lithium hydroxide with a hydroxide of another alkali metal or of an alkaline earth metal.

The mixture consisting of the various above-mentioned adjuvants, namely:

(i) a water-soluble salt derived from an aromatic sulfonic acid condensed with HCHO (employed separately or as a mixture with a water-soluble salt derived from an aromatic sulfonic acid which has not been condensed with HCHO);

(ii) lithium hydroxide; and (iii) a hydroxide of another alkali metal or of an alkaline earth metal, will hereafter be referred to as the adjuvant composition.

DETAILED DESCRIPTION OF THE INVENTION

More particularly, it has now surprisingly been found, that in comparison with those processes which employ water-soluble salts derived from aromatic sulfonic acids condensed with formaldehyde as adjuvants, only the use of the adjuvant composition according to the present invention manifests itself, in cold weather, not only by the maintenance of fluidity, but also by a substantial increase in initial mechanical strengths, for example, those measured after 24 hours, to the point that values very much greater than those obtained in the absence of adjuvant are achieved. In fact, the use of the binary mixtures of adjuvants, such as mixtures of: a salt of an aromatic sulfonic acid condensed with HCHO/lithium hydroxide, or a salt of a sulfonic acid condensed with HCHO/a different hydroxide, manifests itself in a slight loss in fluidity and does not produce an improvement in the initial mechanical strengths.

It should furthermore be noted that the process according to the invention can be carried out without any disadvantage in respect of the medium term mechanical strengths, for example, those measured after 28 days.

As dispersing agents to be incorporated in the cement, there are used, for the purposes of the invention, water-soluble salts of condensation products, of molecular weight between 1,500 and 10,000, obtained by condensing sulfonation products of aromatic monocyclic or fused polycyclic hydrocarbons, containing 1 to 12 benzene rings, with formaldehyde.

By way of example, there are mentioned water-soluble salts obtained by condensing, with formaldehyde, sulfonation products of aromatic hydrocarbons such as benzene, naphthalene, fluorene, anthracene, phenanthrene, pyrene, naphthacene, pentacene, hexacene, heptacene, octacene, nonacene, decacene, undecacene, dodecacene and derivatives of these aromatic compounds having 1 to 3 linear or branched alkyl substituents containing from 1 to 3 carbon atoms.

The condensation products which fall within the scope of the present invention are compounds of the formula:

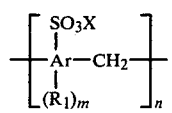

(I)

(II)

in which:
- Ar represents monocyclic or fused polycyclic aryl groups containing from 1 to 12 benzene rings, such as the aryl groups derived from the aromatic hydrocarbons referred to immediately above,
- $R_1$ represents a linear or branched alkyl radical having from 1 to 3 carbon atoms,
- X is a cationic radical of inorganic or organic origin, selected such that the compound of the formula (I) shall be water-soluble,
- m is an integer ranging from 0 to 3 and
- n is a number which is adjusted so as to give a mean molecular weight of between 1,500 and 10,000.

As dispersing agents of the formula (I) which are suitable for carrying out the process according to the invention, there are mentioned those in which the cationic radicals X associated with the sulfonate groups borne by the aromatic rings are inorganic cations derived from alkali metals or alkaline earth metals, such as sodium, potassium, calcium or barium, or are derived from metals selected from the group comprising lead, aluminium, zinc and copper; the cationic radicals X can also be ammonium ions $NH_4^{\oplus}$, or quaternary ammonium ions of the formula $N(R_2R_3R_4R_5)^{\oplus}$, in which the radicals $R_2$, $R_3$, $R_4$ and $R_5$, which can be identical or different, each represent a linear or branched alkyl radical containing from 1 to 4 carbon atoms.

Among the quaternary ammonium cations, there are mentioned, in particular, the tetramethylammonium, tetraethylammonium, methyltriethylammonium, tetrapropylammonium, triethylbutylammonium and tetrabutylammonium ions.

As dispersing agents of the formula (I) which are preferably employed for carrying out the process according to the invention, there are mentioned those in which:
- Ar is a naphthyl group,
- $R_1$ represents a methyl or ethyl radical, and
- the cationic radicals X represent inorganic cations derived from metals such as sodium, potassium, calcium and barium, ammonium ions $NH_4^{\oplus}$ and quaternary ammonium ions, such as the tetramethylammonium, tetrapropylammonium and tetrabutylammonium ions.

Among these preferred dispersants, those which are most preferred are the sodium, potassium, calcium, barium, ammonium and tetramethylammonium salts of the condensation product, of molecular weight between 1,500 and 10,000, obtained by condensing β-naphthalenesulfonic acid with formaldehyde. These salts of high molecular weight condensation products of β-naphthalenesulfonic acid and formaldehyde are prepared by applying the method described in U.S. Pat. No. 2,141,569.

As has been stated above, it is also possible to employ a mixture of dispersants comprising a salt of a high molecular weight condensation product selected from among those mentioned above, together with a water-soluble salt derived from the product of the sulfonation of fused polycyclic aromatic hydrocarbons, and corresponding to the general formula:

in which:
- Ar' represents fused polycyclic aryl groups containing from 2 to 12 benzene rings, such as the aryl groups derived from the fused polycyclic aromatic hydrocarbons referred to above in the definition of the symbol Ar,
- $R_1$, X and m have the meanings given above for formula (I) and
- p is an integer equal to 1 to 2.

Preferred compounds of the formula (II) are those in which:
- Ar' is a naphthyl group,
- $R_1$ represents a methyl or ethyl radical,
- X is a cationic radical representing the inorganic cations derived from sodium, potassium, calcium or barium, $NH_4^{\oplus}$ ions and quaternary ammonium ions, such as the tetramethylammonium, tetrapropylammonium and tetrabutylammonium ions, and
- p is an integer equal to 1.

The aromatic sulfonic acid from which the dispersant of the formula (II) is derived can be the same as that which is used for the preparation of the dispersant of the formula (I) by subsequent condensation with formaldehyde. In such a case, the dispersant salt of the formula (II) can optionally be introduced, either in its entirety or in part, into the hydraulic cement composition at the same time as the dispersant salt of the formula (I), in the form of the by-product which is present when the condensation reaction between the aromatic sulfonic acid and HCHO is incomplete and unreacted aromatic sulfonic acid remains.

Where a mixture of dispersants comprising a salt of a high molecular weight condensation product and a salt of a sulfonation product is employed, the proportion by weight of the latter in the mixture in general does not exceed 5%.

The hydroxides of alkali metals, other than lithium, or of alkaline earth metals, to be employed in the process according to the present invention, comprise the hydroxides of sodium, potassium, magnesium, calcium, strontium and barium.

As examples of mixtures of hydroxides which are very suitable, there are mentioned mixtures of lithium hydroxide with sodium hydroxide, potassium hydroxide and calcium hydroxide.

The mixtures lithium hydroxide/sodium hydroxide and lithium hydroxide/potassium hydroxide are very particularly suitable.

The adjuvants of the formulae (I) and (II) can be employed equally as well when they are in the form of an anhydrous or hydrated powder, or when same are in the form of a solution in water. The same is true of the hydroxides used. It should be noted that unless specifically stated otherwise, the various adjuvants according to the invention are to be understood as being in their anhydrous form.

The amounts of the various adjuvants according to the invention which are introduced into the hydraulic cement compositions can vary over wide limits.

More particularly, the various adjuvants are introduced in the following amounts:

0.05 to 3%, by weight relative to the cement, of the salt of the high molecular weight condensation product of the formula (I), or of the mixture of such a salt with a salt of a sulfonation product of the formula (II), 0.001 to 0.05%, by weight relative to the cement, of lithium hydroxide, and 0.01 to 0.6%, by weight relative to the cement, of a hydroxide of another alkali metal, or of an alkaline earth metal.

Preferably, the adjuvants according to the invention are employed in the following amounts:

0.05 to 1%, by weight relative to the cement, of the salt of the high molecular weight condensation product (I), or of the mixture of such a salt with a salt of a sulfonation product (II), 0.001 to 0.02%, by weight relative to the cement, of lithium hydroxide, and 0.01 to 0.3%, by weight relative to the cement, of a hydroxide of another alkali metal or of an alkaline earth metal.

The process according to the present invention is applicable to all types of hydraulic cements and, in particular, to cements of the Portland type in which the clinker with addition of gypsum represents at least 80% of the total weight; the possible additives, which amount to at most 20% by weight, can be fly ash from central heating plants, pozzolane, blast furnace slag or mixtures of such products. The process according to the invention is equally applicable to slag cements.

When the cement is used for the production of concrete or mortar, the nature, proportion and particle size of the aggregate can also vary over wide limits. All mixtures of known types can be considered for the subject process.

The adjuvant composition according to the invention can be introduced into the cement when the latter is ground together with the gypsum in the cement factory. It is also possible to disperse the adjuvant composition in the cement and the aggregate, or in the cement alone in the case of a thin mortar, before mixing with water, or to introduce it into the mixing water before the latter is used. The adjuvant composition can also be introduced into the fresh concrete immediately before the latter is poured into the shuttering. When the adjuvant composition is in the form of a powder, it can advantageously be mixed with a product which does not affect the behavior of the cement at the dose at which it is used, such as, for example, activated silica; this product is used to prevent any substantial uptake of moisture by the adjuvant composition during storage.

The adjuvant composition employed in the present invention can be used successfully in conventional concretes, such as reinforced concrete, roadmaking concretes, concretes used for prefabrication, prestressed concretes and thin mortars used for injection. The adjuvant composition is of particular value in reinforced and prestressed concretes because it exhibits a very marked anti-corrosive character.

In order to further illustrate the present invention and the advantages thereof, the following specific examples are given, it being understood that same are intended only as illustrative and in nowise limitative.

EXAMPLES 1 and 2

These two examples were carried out by incorporating, into mortars based on artificial Portland cement containing blast furnace slag (type CPA1 325 GUER-VILLE cement), various proportions of the following three adjuvants:

(1) the sodium salt of a condensation product of β-naphthalenesulfonic acid and formaldehyde, having a mean molecular weight of 4,980, in the form of an aqueous solution containing 40% by weight of anhydrous salt, (2) crystalline lithium hydroxide, of the formula LiOH.H$_2$O, and (3) sodium hydroxide.

By way of comparison, experiments were carried out on a mortar free from adjuvant (experiment A), on a mortar to which the solution of the sodium salt of the condensation product of β-naphthalenesulfonic acid and HCHO was added (experiment B) and on mortars containing the following binary mixtures of adjuvants:

(a) a solution of the sodium salt of the condensation product of β-naphthalenesulfonic acid and HCHO, together with either LiOH.H$_2$O (experiment C) or with NaOH (experiment D), and (b) LiOH.H$_2$O together with NaOH (experiment E).

Each mortar was made up at 5° C. and had the following composition:

NF.P. 15,403 sand 1,350 g
CPAL 325 GUERVILLE 450 g
Water 225 g (W/C=0.5).

The mortar was made up in accordance with Standard Specification NF.P. 15,403. The adjuvants were mixed beforehand with the mixing water. The proportions of the various adjuvants are given in percentages by weight, relative to the Portland cement, of the additive in anhydrous state.

In the table which follows, the workability of the mortar was measured 10 minutes after mixing, from the slump of the mortar which had before hand been molded in a truncated cone of base diameter 8 cm, upper diameter 7 cm and height 4 cm. The mortar was placed on a shock-imparting table and was then subjected to a series of 60 shocks at the rate of one shock per second. After release from the mold, the mortar was again subjected to a series of 15 shocks at the rate of one shock per second. The shock was caused by dropping the mortar through a height of 15 mm. The slump is expressed in centimeters and corresponds to the mean diameter of the cake obtained after the various shocks (flow test method).

The measurements of the flexural strength and compressive strength were carried out in accordance with Standard Specification NF.P. 15,451. The strengths were determined on samples of size 4×4×16 cm which were kept in a chamber at 5° C. and 95% relative humidity up to the time of the experiment.

For the flexural experiment, the sample was placed on two supports consisting of 10 mm diameter rollers at a distance of 106.7 mm from one another; a third roller, of the same diameter, and equidistant from the two other rollers, transmitted a load which was increased by 5 da N/s. The flexural strength, corresponding to the breaking of the sample, is expressed in bars.

For the compressive experiment, the measurement was carried out on the two pieces of sample resulting from the flexural break. The compression was transmitted by two hard metal plates of at least 10 mm thickness, 40 mm width and 40 mm length. The load was increased to the breaking point at a speed such that the increase in stress is 15 bars/s. The results are expressed in bars.

The results given are the mean of the results on 3 samples broken under flexural stress, and hence of 6 compressive measurements.

Such results are shown in the table which follows:

TABLE I

| EXAMPLE/EXPERIMENT | EXPERIMENT A | EXAMPLE 1 | EXPERIMENT B | EXPERIMENT C | EXPERIMENT D | EXPERIMENT E | EXAMPLE 2 |
|---|---|---|---|---|---|---|---|
| Adjuvants: % by weight of adjuvant in the anhydrous state, relative to the cement: | | | | | | | |
| sodium polymethylene-naphthalenesulfonate | 0 | 0.12 | 0.12 | 0.12 | 0.12 | 0 | 0.24 |
| lithium hydroxide | 0 | 0.0043 | 0 | 0.0043 | 0 | 0.0043 | 0.0086 |
| sodium hydroxide | 0 | 0.07 | 0 | 0 | 0.07 | 0.07 | 0.14 |
| Slump in cm 10 minutes after mixing | 15 | 16.8 | 16.6 | 16.4 | 15.9 | 14.6 | 17.8 |
| Flexural strength in bars after 24 hours | 4 | 6.5 | 4 | 4 | 3.5 | 4 | 6.5 |
| Compressive strength in bars after 24 hours | 10 | 15 | 8 | 7.5 | 6.5 | 7 | 15.6 |

PREPARATION OF THE SODIUM POLYMETHYLENE-NAPHTHALENE-SULFONATE 640 g (6.5 mols) of concentrated sulfuric acid (d=1.84) were introduced into a 3 liter flask, equipped with a mechanical stirrer and a heating system, and the temperature thereof was raised to a value of 160° C. The stirring was commenced and 640 g (5 mols) of purified naphthalene were introduced slowly, the temperature being maintained at the above-mentioned value.

Once the addition of the naphthalene had been completed, the reaction mixture was stirred at 160° C. until all the naphthalene employed had reacted; the time required was about 4 hours.

The sulfonation mixture was then cooled to 100° C. and thereafter was diluted with 282 g of water. The temperature of the mixture was raised to 80° C. and 76.8 g of an aqueous formaldehyde solution containing 40% by weight of HCHO were then added. The reaction mixture was then stirred at 80° C. for one hour.

After this time, an additional 76.8 g of the aqueous formaldehyde solution were introduced into the reaction mixture and stirring was continued at 80° C. for one hour. This type of operation was repeated twice more.

After the whole of the formaldehyde solution (307.2 g) had been added, the temperature of the reaction mixture was increased gradually to 95–100° C. over a period of about one hour. Once this temperature had been reached, the reaction mixture was stirred for an additional 18 hours.

After this time, it was cooled to ambient temperature (25° C.) and potentiometric determinations were carried out on the sulfuric acid present (which corresponded to 1.5 mols of sulfuric acid) and on the sulfonic acid present (which corresponded to 5 mols of sulfonic acid). The reaction mixture was then neutralized accurately with an aqueous mixture containing 111.15 g of Ca-(OH)$_2$ and 200 g of NaOH. The calcium hydroxide neutralized the sulfuric acid and gave a precipitate of hydrated calcium sulfate which was filtered off. The filtrate solution contained the desired sodium polymethylene-naphthalenesulfonate; the filtrate was concentrated so as to obtain an aqueous solution containing 40% by weight of pure sodium polymethylenenaphthalenesulfonate.

EXAMPLES 3 and 4

These two examples of a mortar were produced at 5° C. by incorporating the adjuvant composition employed in Example 1 into mortars based on:
Artificial Portland cement, type CPA 400 VICAT (Example 3), and
Slag cement+clinker, type CLK 325 VICAT (Example 4).

By way of comparison, mortar experiments were carried out with mortars free from adjuvant (mortar with CPA 400 VICAT cement—experiment F; mortar with CLK 325 VICAT cement—experiment G).

The results were as follows:

TABLE II

| EXAMPLE/EXPERIMENT | Example 3 | Experiment F | Example 4 | Experiment G |
|---|---|---|---|---|
| Slump in cm, 10 minutes after mixing | 15.3 | 13.8 | 17 | 15.5 |
| Flexural strength in bars after: | | | | |
| 24 hours | 11.3 | 8.3 | 5.5 | 0 |
| 28 days | 59 | 57 | 37.5 | 32 |
| Compressive strength in bars after: | | | | |
| 24 hours | 28.1 | 21 | 7.4 | 6.1 |
| 28 days | 331 | 334 | 227 | 178 |

Each mortar was made up as indicated in Examples 1 and 2.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A composition of matter, comprising (i) a member selected from the group which comprises (ia) a water-soluble salt of the condensation product of an aromatic sulfonic acid with formaldehyde, said salt having a mean molecular weight between 1,500 and 10,000, and (ib) the admixture of such salt (ia) with a water-soluble salt of an aromatic sulfonic acid itself; (ii) lithium hydroxide; and (iii) a hydroxide of an alkali metal other than lithium or of an alkaline earth metal.

2. The composition of matter as defined by claim 1, said salt (ia) having the structural formula:

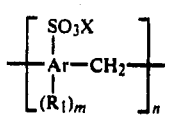

in which:
Ar represents a monocyclic or fused polycyclic aryl group containing from 1 to 12 benzene rings,
$R_1$ represents a linear or branched alkyl radical having from 1 to 3 carbon atoms,
X is an inorganic or organic cation selected such that the salt of the formula (I) is water-soluble,
m is an integer ranging from 0 to 3, and
n is a number such that the salt has a mean molecular weight of between 1,500 and 10,000.

3. The composition of matter as defined by claim 2, wherein said salt is the condensation product of the sulfonic acid of a member selected from the group comprising benzene, naphthalene, fluorene, anthrazene, phenanthrene, pyrene, naphthacene, pentacene, hexacene, heptacene, octacene, nonacene, decacene, undecacene, dodecacene, and the mono-, di- or tri-lower alkyl derivatives thereof.

4. The composition of matter as defined by claim 2, wherein X is selected from the group consisting of sodium, potassium, calcium, barium, lead, aluminium, zinc, copper, ammonium, or a quaternary ammonium ion of the formula $N(R_2R_3R_4R_5)^{\oplus}$, in which the radicals $R_2$, $R_3$, $R_4$ and $R_5$, which can be identical or different, each represent a linear or branched alkyl radical containing from 1 to 4 carbon atoms.

5. The composition of matter as defined by claim 4, wherein Ar is naphthyl, $R_1$ is methyl or ethyl, and X is selected from the group consisting of sodium, potassium, calcium, barium, ammonium, and quaternary ammonium.

6. The composition of matter as defined by claim 5, the salt (ia) being the condensation product of β-naphthalenesulfonic acid with formaldehyde, and X being selected from the group consisting of sodium, potassium, calcium, barium, ammonium and tetramethylammonium.

7. The composition of matter as defined by claim 5, X being a quaternary selected from the group consisting of tetramethylammonium, tetraethylammonium, methyltriethylammonium, tetrapropylammonium, triethylbutylammonium and tetrabutylammonium.

8. The composition of matter as defined by claim 2, the member (i) comprising the salt (ia) in admixture with a salt (ib) having the structural formula:

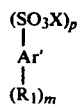

in which:
Ar' represents a fused polycyclic aryl group containing from 2 to 12 benzene rings,
$R_1$ represents a linear or branched alkyl radical having from 1 to 3 carbon atoms,
X is an inorganic or organic cation selected such that the salt (II) is water-soluble,
m is an integer ranging from 0 to 3, and
p is an integer equal to 1 or 2.

9. The composition of matter as defined by claim 8, wherein the salt (II) Ar' is naphthyl, $R_1$ is methyl or ethyl, p is 1, and X is selected from the group consisting of sodium, potassium, calcium, barium, ammonium and lower alkyl quaternary ammonium.

10. The composition of matter as defined by claim 8, wherein the amount, by weight, of the salt (ib) in the admixture (i) does not exceed 5%.

11. The composition of matter as defined by claim 1, the hydroxide (iii) being selected from the group consisting of sodium, potassium, magnesium, calcium, barium and strontium hydroxide.

12. The composition of matter as defined by claim 11, the hydroxide (iii) being selected from the group consisting of sodium, potassium and calcium hydroxide.

13. The composition of matter as defined by claim 2, the member (i) essentially consisting of the salt (ia).

14. In a settable hydraulic cement, the improvement which comprises, as an adjuvant therefor, the composition of matter as defined by any one of the preceding claims 1 to 13.

15. The settable hydraulic cement as defined by claim 14, the same comprising from 0.05 to 3% by weight of such cement, of the salt (i); from 0.001 to 0.05% by weight of such cement, of the lithium hydroxide (ii); and from 0.01 to 0.6% by weight of such cement, of the hydroxide (iii).

16. The settable hydraulic cement as defined by claim 15, the same comprising from 0.05 to 1% by weight of such cement, of the salt (i); from 0.001 to 0.02% by weight of such cement, of the lithium hydroxide (ii); and from 0.01 to 0.3% by weight of such cement, of the hydroxide (iii).

17. The settable hydraulic cement as defined by claim 14, the same comprising a Portland cement.

18. The settable hydraulic cement as defined by claim 14, the same comprising a slag cement.

19. The hydraulic cement as defined by claim 14, in set form.

20. A shaped article comprising the hydraulic cement as defined by claim 19.

21. In a method for improving the processibility and initial mechanical strengths of a settable hydraulic cement, the improvement which comprises formulating therewith, as an adjuvant therefor, the composition of matter as defined by claim 1.

22. A composition of matter, comprising (i) a hydraulic settable cement; (ii) a filler for the cement (i); (iii) a member selected from the group comprising (iiia) a water-soluble salt of the condensation product of an aromatic sulfonic acid with formaldehyde, said salt having a mean molecular weight between 1,500 and 10,000, and (iiib) the admixture of such salt (iiia) with a water-soluble salt of an aromatic sulfonic acid itself; (iv) lithium hydroxide; and (v) a hydroxide of an alkali metal other than lithium or of an alkaline earth metal.

23. The composition of matter as defined by claim 21, further comprising (vi) a cement setting amount of water.

24. A composition of matter, consisting essentially of (i) a member selected from the group which comprises (ia) a water-soluble salt of the condensation product of an aromatic sulfonic acid with formaldehyde, said salt having a mean molecular weight between 1,500 and 10,000, and (ib) the admixture of such salt (ia) with a water-soluble salt of an aromatic sulfonic acid itself; (ii) lithium hydroxide; and (iii) a hydroxide of an alkali metal other than lithium or of an alkaline earth metal.

25. A composition of matter, consisting essentially of (i) a hydraulic settable cement; (ii) a filler for the cement (i); (iii) a member selected from the group which comprises (iiia) a water-soluble salt of the condensation product of an aromatic sulfonic acid with formaldehyde, said salt having a mean molecular weight between 1,500 and 10,000, and (iiib) the admixture of such salt (iiia) with a water-soluble salt of an aromatic sulfonic acid itself; (iv) lithium hydroxide; and (v) a hydroxide of an alkali metal other than lithium or of an alkaline earth metal.

* * * * *